Aug. 11, 1931.  F. F. KOOKOGEY  1,818,067
AEROPLANE
Filed Oct. 28, 1929   2 Sheets-Sheet 1
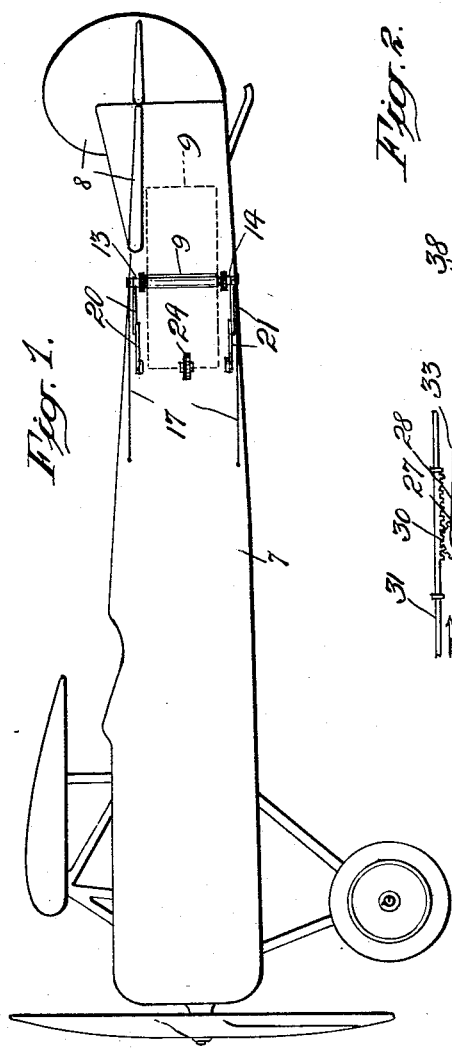
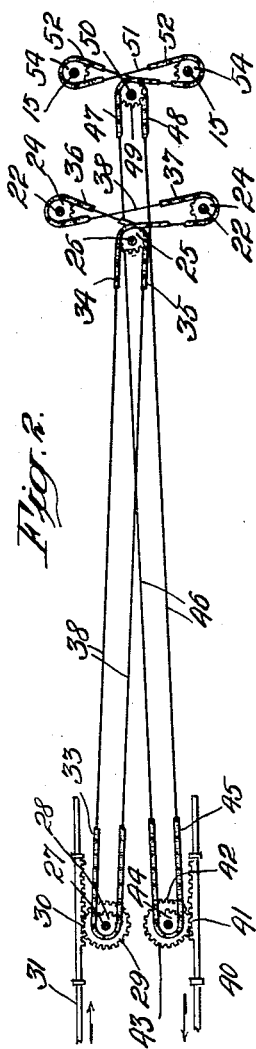
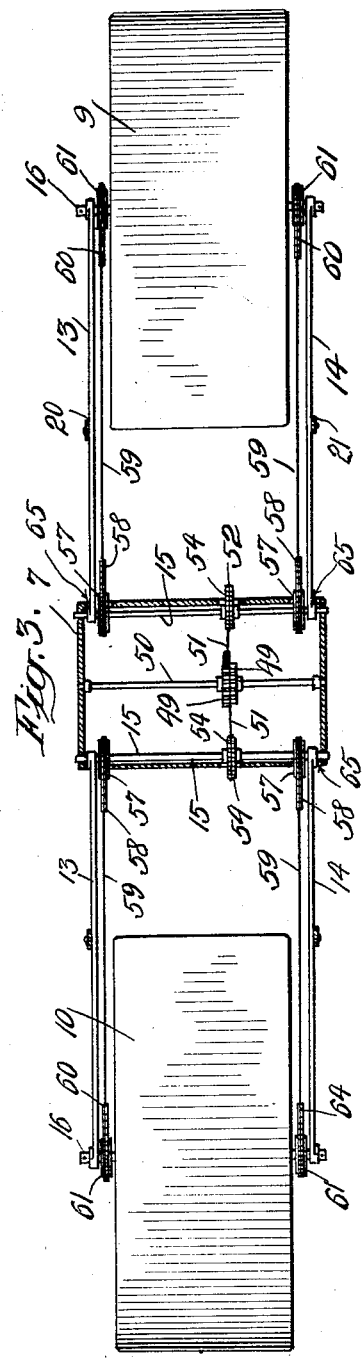
INVENTOR
FREDERIC F. KOOKOGEY
BY
ATTORNEY

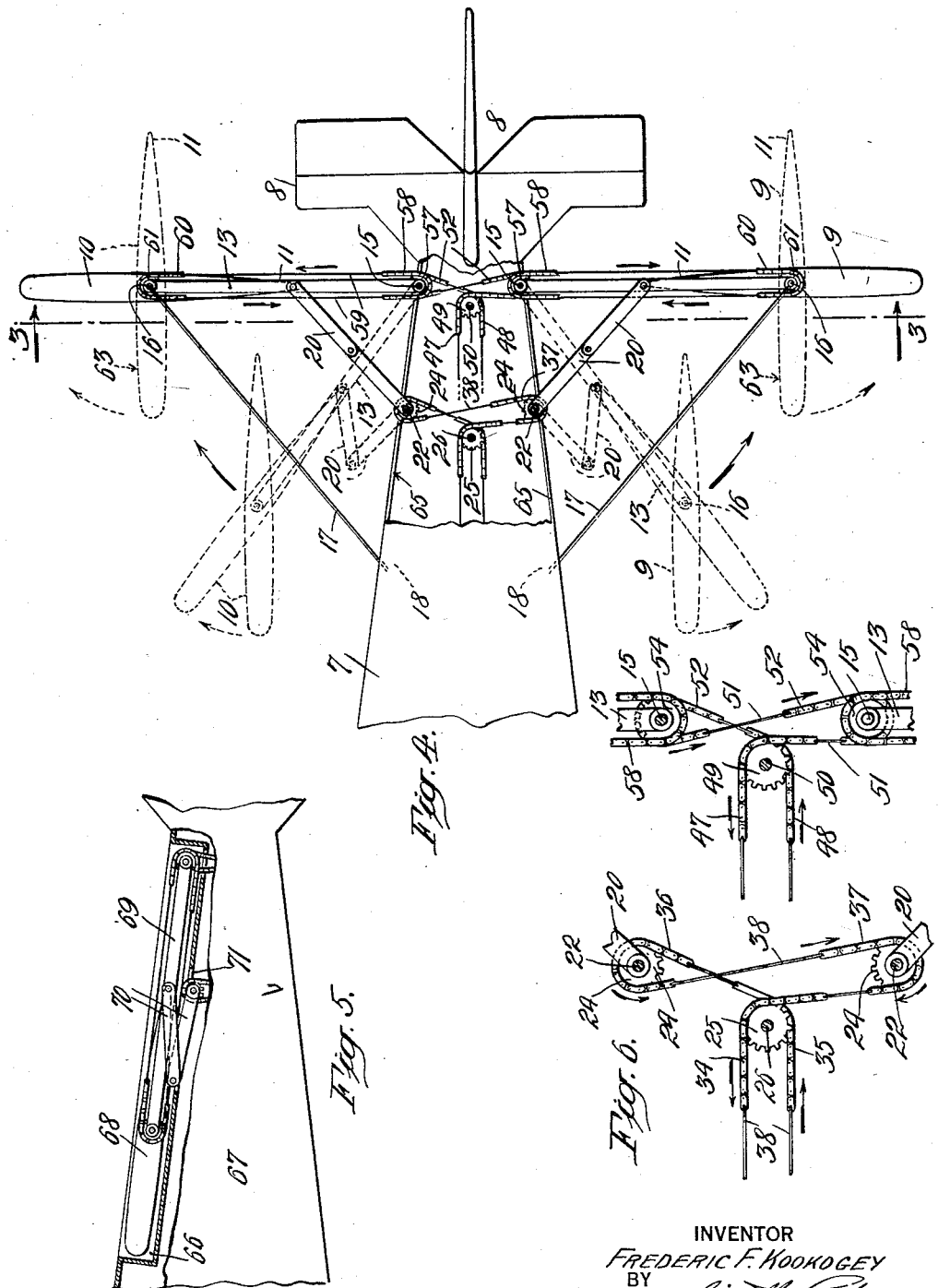

Patented Aug. 11, 1931

1,818,067

UNITED STATES PATENT OFFICE

FREDERIC F. KOOKOGEY, OF NEW YORK, N. Y.

AEROPLANE

Application filed October 28, 1929. Serial No. 402,869.

The invention relates to an improvement in aeroplanes, and more particularly to an improvement in aeroplane brake devices which function to assist the aeroplane in landing safely in restricted areas and in rising therefrom, which also function to prevent accidents by automatically restoring the balance of the aeroplane from nose dives, tail spins and side slips, and which are also used in reducing the speed of the aeroplane without slowing down the motor or losing altitude or stability.

The object of the invention is to produce an improved braking device of the above described type so arranged with respect to the fuselage and the laterally extending rudder members at the rear end thereof that it will not interfere with the normal operation of the rudder and tail controls. Another object of the invention is to arrange the braking device so that the brake vanes or planes thereof may occupy various positions of operation spaced apart from the sides of the fuselage and positioned at various angles relatively to the axis of the fuselage in order to secure the desired braking action. To these ends the invention consists in the improved braking device for aeroplanes hereinafter fully described and particularly pointed out in the appended claims.

In the accompanying drawings illustrating the preferred form of the invention, Fig. 1 is a side elevation of an aeroplane of usual construction and showing the application of the improved braking device thereto, the brake planes being in extreme operative position; Fig. 2 is a diagrammatic top plan of the controls for operating the brake planes Fig. 3 is a vertical section taken on the line 3—3 of Fig. 4 and looking in the direction of the arrows; Fig. 4 is a top plan on an enlarged scale of the rear end of the fuselage and showing the braking device in extreme operative position in full lines and in an intermediate operative position in dotted lines; Fig. 5 is a detail plan of the rear of the fuselage and showing a modified arrangement of holding the brake planes in inoperative position; and Fig. 6 is an enlarged detail of the rear ends of the controls for operating the braking device.

The aeroplane shown in Fig. 1 may be of any usual type including a fuselage 7 having at its rear end the laterally extending rudder members 8. The braking device of the present invention comprises two brake planes or vanes 9 and 10 located one on one side and the other on the other side of the fuselage and forward of the laterally projecting rudder members 8. The braking device is so constructed and arranged that, as shown on Fig. 4, the brake planes 9 and 10 have an extreme operative position at right angles to the axis of the fuselage and with their inner ends 11 spaced apart from the adjacent sides of the fuselage a distance substantially equal to the amount the rudder members 8 project laterally from the sides of the fuselage. It can thus be seen that in this position of the brake planes there is no interference with the rudder members or the tail controls of the areoplane. The brake planes are so mounted that they can be moved from their extreme operative position at right angles to the axis of the fuselage to an inoperative position substantially parallel with the sides of the fuselage and relatively close thereto or to any intermediate position at any angle relatively to the axis of the fuselage in order to secure the desired braking effect. The total area of the two brake planes will be in proportion to the size of the aeroplane and it will usually be sufficient to cause a drag equivalent to a head wind having a velocity of half the normal speed of the aeroplane. The brake planes should be arranged substantially perpendicular to the plane of the supporting wings or aerofoils. With such an arrangement the brake planes of the present invention are highly efficient in retarding the speed of the aeroplane, in conducing to safe landings at a sharp angle in restricted areas and in rising therefrom, and in automatically restoring the balance of the aeroplane from nose dives, tail spins and side slips.

The means for supporting the two brake planes 9 and 10 comprises for each brake plane a pair of arms, an upper arm 13 and a lower arm 14, pivotally mounted at their inner ends on a vertically arranged shaft 15 journaled in the upper and lower walls of the fuselage 7, as clearly indicated in Fig. 3. Each brake plane is fixed on a vertically arranged shaft 16 journaled in the outer ends of the arms 13 and 14. The shafts 15 are located forward of the laterally extending rudder members 8, as shown in Fig. 4. When the brake planes 9 and 10 are in their extreme operative position at right angles to the axis of the fuselage, the supporting arms 13 and 14 are also arranged at right angles to the axis of the fuselage and they are held from going rearwardly beyond this position by means of the stay wires 17 connected at their inner ends with shock absorption or tension devices indicated in dotted lines at 18. When the brake plane supporting arms 13 and 14 are swung inwardly toward the fuselage the devices 18 wind up the stay wires 17. Such devices are of well-known construction and need no detailed description.

The means for swinging each pair of plane supporting arms 13 and 14 into operative and inoperative positions comprises two pairs of toggle arms, one pair 20 being pivotally connected with the upper arm 13 and the other pair 21 being pivotally connected with the lower arm 14. At their inner ends the toggle arms are fixed to vertically arranged shafts 22 journaled in the fuselage forward of the shafts 15. By turning the shafts 22 in one direction the toggle arms cause the plane supporting arms to be swung outwardly from the fuselage and by turning the shafts 22 in the opposite direction the toggle arms 20 cause the brake plane supporting arms to be swung inwardly against the fuselage.

The means for turning the shafts 22 to swing the brake plane supporting arms into operative and inoperative positions consists of a control system including a gear 24 fixed on each shaft 22, two gears 25, one above the other, fixed on the vertically arranged shaft 26, the shaft 27 on which are mounted the gears 28 and 29, and the rack 30 operated by a rod 31 under the control of the operator or pilot. An endless chain consisting of link and rod connections passes around the gears 28, 25 and 24, said chain consisting of the link members 33, 34, 35, 36 and 37 and the rod sections 38 which are threaded at their ends so that the link sections may at all times closely engage with the gears. By moving the rod 31 in the direction indicated by the arrow the shaft 22 on the left hand side of the fuselage is turned in a counter-clockwise direction and the shaft 22 on the right hand side of the fuselage is turned in a clockwise direction, with the result that the four pairs of toggle arms 20 and 21 move the brake plane supporting arms outwardly as indicated by the dotted lines in Fig. 4. The amount of movement of the rod 31 determines at what angle to the axis of the fuselage the brake plane supporting arms will be held, whether at right angles to the axis of the fuselage or in an intermediate position. As the brake plane supporting arms swing from inoperative position to their extreme operative position the brake planes 9 and 10 remain in a position substantially parallel with the axis of the fuselage.

The means for turning the brake planes 9 and 10 to hold them at any desired angle to secure the proper braking effect with respect to the speed of the aeroplane consists of a rod 40 on which is mounted a rack 41 meshing with a gear 42 mounted on a shaft 43 on which is also mounted a gear 44 over which passes a link section 45 connected by the rod sections 46 with the link sections 47 and 48 passing over the gears 49 mounted one above the other on the shaft 50, the link sections 47 and 48 being connected by the rod sections 51 with the link sections 52 which pass over the gears 54 mounted on the shafts 15. On the upper and lower ends of each shaft 15 are mounted gears 57 over which pass link sections 58 connected by the rod sections 59 with the link sections 60 which pass over the gears 61 mounted on the upper and lower ends of the shafts 16. By moving the rod 40 in the direction indicated by the arrow the shaft 15 located at the left hand side of the fuselage is turned in a counter-clockwise direction and the shaft 15 located at the right hand side of the fuselage is turned in a clockwise direction, and consequently the brake planes 9 and 10, if the supporting arms 13 and 14 are in extreme operative positions, are moved from the positions indicated by the dotted lines 63 to the positions indicated by the full lines, or to any intermediate positions depending upon the amount of braking action required. To aid in turning the brake planes 9 and 10 they should be mounted just beyond their center lines so that the wind pressure upon them will assist in turning them with a minimum load upon the controls.

The brake planes 9 and 10 being shown in full operative position, the link and rod sections of the controls move in the direction of the arrows (near them) in returning the brake planes to inoperative position.

In the form of the invention shown in Figs. 1 to 4 inclusive the brake plane supporting arms 13 and 14 swing into apertures 65 formed in the sides of the fuselage, and the brake planes 9 and 10 when in inoperative position will lie against the sides of the fuselage. In Fig. 5 is shown a modified arrangement in which a recess 66 is provided in the side of the fuselage 67 to receive a brake plane 68. In this arrangement the brake plane supporting arms 69 also lie within the recess 66 and the operating toggle 70 works through a slot 71 in the wall of the recess 66.

Having thus described the invention what I claim as new is:—

1. The combination with an aeroplane fuselage having laterally projecting rudder members at its rear end, of a braking device located forward of the rudder members and comprising two brake planes located one on each side of the fuselage and having an inoperative position substantially parallel with the sides of the fuselage, and an extreme operative position at right angles to the axis of the fuselage with the inner ends of the planes spaced from the sides of the fuselage a distance substantially equal to the amount the rudder members project laterally from the fuselage, means for supporting the brake planes, and means under the control of the operator for moving the brake planes into and out of operative position.

2. The combination with an aeroplane fuselage, of a braking device comprising two brake planes located one on each side of the fuselage, means including a plurality of levers and links shiftable toward and away from the fuselage for supporting the brake planes, said supporting means permitting the brake planes to have an inoperative position relatively close to the sides of the fuselage and operative positions spaced apart from the sides of the fuselage and at the various angles relatively to the axis of the fuselage, and means under the control of the operator for shifting the levers and links to move the brake planes into and out of operative positions.

3. The combination with an aeroplane fuselage having rudder members at its rear end, of a braking device comprising two brake planes located one on each side of the fuselage, a frame for supporting each brake plane consisting of two horizontally arranged arms, a shaft vertically journaled in the fuselage forward of the rudder members and on which the inner ends of the arms are pivoted, the brake planes being pivotally mounted in the free ends of the arms, means for swinging the arms from an inoperative position relatively close to the sides of the fuselage to an extreme operative position at right angles to the axis of the fuselage, and means for turning the brake planes in order that they may occupy positions at various angles relatively to the axis of the fuselage.

4. The combination with an aeroplane fuselage having laterally projecting rudder members at its rear end, of a braking device comprising two brake planes located one on each side of the fuselage, said planes having an extreme operative position at right angles to the axis of the fuselage and with their inner ends spaced from the sides of the fuselage a distance substantially equal to the amount the rudder members project from the fuselage, means for supporting each brake plane consisting of two arms in the outer ends of which the brake plane is pivotally mounted, a vertically arranged shaft journaled in the fuselage forward of the rudder members and on which the inner ends of the arms are pivoted, means for swinging each pair of arms from a position relatively close to the sides of the fuselage to a position at right angles to the axis of the fuselage consisting of a shaft vertically journaled in the fuselage forward of the shaft on which the plane-supporting arms are pivoted, toggle arms connecting the second shaft with the plane supporting arms, means for operating the toggle-arm shaft, and means for turning the brake planes on their supporting arms so that the brake planes may have operative positions at various angles relatively to the axis of the fuselage.

5. The combination with an aeroplane fuselage having laterally projecting rudder members at its rear end, of a braking device comprising two brake planes located one on each side of the fuselage forward of the rudder members, said brake planes having an inoperative position substantially parallel with and relatively close to the sides of the fuselage and an extreme operative position at right angles to the axis of the fuselage and with their inner ends spaced apart from the sides of the fuselage a distance substantially equal to the amount the rudder members project from the fuselage, means for supporting the brake planes so that they may occupy any position between their inoperative position and their extreme operative position, and means for turning the brake planes so that they may have operative positions at various angles relatively to the axis of the fuselage.

FREDERIC F. KOOKOGEY.